United States Patent [19]

Malhotra et al.

[11] Patent Number: 5,266,610
[45] Date of Patent: Nov. 30, 1993

[54] TOUGHENED COCONTINUOUS RESIN SYSTEM

[75] Inventors: Vinay Malhotra, Tempe; Gregory R. Almen, Mesa; Mary Hushower, Tempe, all of Ariz.

[73] Assignee: ICI Composites Inc., Tempe, Ariz.

[21] Appl. No.: 951,029

[22] Filed: Sep. 24, 1992

Related U.S. Application Data

[63] Continuation of Ser. No. 666,984, Mar. 11, 1991, abandoned.

[51] Int. Cl.$^5$ .................. C08K 9/04; C08F 283/00
[52] U.S. Cl. .................. 523/201; 428/407; 523/202; 523/209; 523/216; 525/523; 525/534; 525/535; 525/902
[58] Field of Search ............... 428/407; 523/201, 202, 523/209, 216; 525/109, 523, 534, 535, 902

[56] References Cited

U.S. PATENT DOCUMENTS

| | | | |
|---|---|---|---|
| 4,495,324 | 1/1985 | Chacko et al. | 525/902 |
| 4,656,207 | 4/1987 | Jabloner et al. | 523/400 |
| 4,661,559 | 4/1987 | Gardner et al. | 525/523 |
| 4,666,961 | 5/1987 | Nauman | 523/340 |
| 4,794,148 | 12/1988 | Nakamura et al. | 525/523 |
| 4,902,752 | 2/1990 | Shimp | 525/390 |
| 4,957,801 | 9/1990 | Maranci et al. | 428/147 |
| 4,962,162 | 10/1990 | Kosuda et al. | 525/523 |
| 4,977,215 | 12/1990 | Gardner et al. | 525/119 |
| 4,983,683 | 1/1991 | Shimp | 525/390 |

FOREIGN PATENT DOCUMENTS

| | | | |
|---|---|---|---|
| 0274899 | 7/1988 | European Pat. Off. | |
| 0295005 | 12/1988 | European Pat. Off. | 523/216 |
| 0385736 | 9/1990 | European Pat. Off. | 523/201 |
| 0042748 | 3/1982 | Japan | 523/202 |
| 0042750 | 3/1982 | Japan | 523/202 |
| 1223019 | 10/1986 | Japan | 525/535 |
| 2101649 | 5/1987 | Japan | 523/209 |
| 2236821 | 10/1987 | Japan | 523/209 |

*Primary Examiner*—Paul R. Michl
*Assistant Examiner*—Peter Szekely

[57] ABSTRACT

The present invention is directed to a composite resin system comprised of thermoplastic and thermoset resins wherein the phase morphology is cocontinuous. To this composite resin system are added particulate toughening agents which improve the toughness.

14 Claims, No Drawings

TOUGHENED COCONTINUOUS RESIN SYSTEM

This is a continuation of copending application Ser. No. 07/666,984 filed on Mar. 11, 1991, now abandoned.

BACKGROUND OF THE INVENTION

The present invention is directed to a toughened cocontinuous resin system comprised of thermoset and thermoplastic components and a single and/or plurality of particulate toughening agents. The particulate toughening agents provide improved toughness to impact phenomena while maintaining the other properties of the composite resin system.

It is known in the composite resin art that certain additives improve the properties of composite materials. The addition of a thermoplastic component has been shown to increase toughness in a cocontinuous phase morphology as disclosed in U.S. patent application Ser. No. 391,279 now abandoned filed Aug. 8, 1989 herein incorporated by reference as filed. High strength fiber additives have also been used to increase composite toughness as is well known to those skilled in this art.

Recently, elastomeric additives have been introduced into composite resin systems and have been shown to improve properties. U.S. Pat. No. 4,783,506 discloses the use of infusible particles which are claimed to improve toughness in epoxy resin systems with a continuous and discontinuous phase matrix system. U.S. Pat. No. 4,977,218 discloses carboxylated rubber particles as tougheners for composites. European patent application 87311364.1 discloses an additive particle comprised of a semi-interpenetrating polymer-network structure to improve composite toughness.

Phase morphologies in the toughened composite resin art have been identified as comprising four distinct types. These types, identified by microscopic techniques, are homogeneous, particulate, phase inverted, and cocontinuous. A homogeneous morphology is defined essentially as lacking identifiable structures at a certain magnification. A particulate morphology is defined as specks of a discontinuous phase surrounded by a larger continuous phase. Phase inverted morphology is defined as islands of a discontinuous phase in a smaller continuous phase. The cocontinuous morphology is defined as more than one phase with no discontinuous phases present. As those skilled in this art appreciate, phase morphologies are defined at comparable magnifications and that at some magnification the above distinctions may not be as clear. However, for the purposes of this art, the above defined morphologies distinguish composite resin systems.

The composite resin industry has been improving these materials over the past couple of decades and with the improvements has introduced composites to new uses. As a result of these efforts, this art is very active in continuing to improve the properties of composite materials since more of these materials are finding their way into the structures of airplanes, automobiles, and boats, which in the past have been typically constructed with other materials. The advantages of tough, light weight materials for structural uses are realized, in part, by the economy in energy savings. These materials are also found useful in sporting goods, in the production of intermediate products such as prepreg or for that matter in any use where a strong, tough, light weight material is found advantageous.

SUMMARY OF THE INVENTION

A thermoset and thermoplastic resin system comprising a cocontinuous phase morphology wherein the improvement comprises the addition of a particulate toughening agent. The toughening agent may be a powder and applied to the resin system by spraying, coating techniques and/or blended into the resin system. The toughening agent may be in a fibril form, flake form, or some combination thereof. These particles may be fusible, infusible, and/or partially fusible in the resin system. The particles may or may not possess functional groups that are reactive with the resin system. If functionality is present, it is preferable that the reactivity is latent. Preferably, the particulate toughening agent comprises a core-shell combination wherein the core comprises one component, the shell some other component. In the preferable embodiment the core may be harder than the shell but it is not required. The shell may compromise harder material and/or the shell may be layered in its construction. Most preferably, the inner hard core component is comprised of a single and/or a plurality of organic polymers or inorganic oxides from the first, second, and/or third transition series of the periodic chart such as silica, alumina, zirconia, and/or naturally occurring minerals such as feldspars, silicates, aluminates, zirconates, and/or other hardened materials such as carbides, nitrides, silicides, aluminides, and/or some combination thereof and therebetween. The outer soft shell component may be comprised of rubbers such as diene, olefin rubbers, natural rubber, polyisoprene, copolymers thereof, ethylene propylene monomer rubber, diene-acrylonitrile copolymers, copolymers of vinyl aromatic monomers, styrene-butadiene copolymers known as SBR rubbers, and terpolymers of dienes with acrylonitrile or unsaturated esters and styrene or vinyl toluene. Optionally, the soft shell can include modifications with functionalities such as carboxyl, hydroxyl, epoxy, cyanates, isocyanates, amino, thiol, unsaturated functionalities such as vinyl, allyl, propenyl, acetylene, propagyl, unsaturated imide, some combination thereof and/or therebetween.

Importantly, the thermoset and thermoplastic components may be comprised of any thermoset and/or thermoplastic. The following thermosets are advantageous for the present invention: addition-polymerisation resins such as acrylics, vinyls, bismaleimides and unsaturated polyesters; formaldehyde condensate resins such as with urea, melamine or phenols; cyanate resins, isocyanate resins, functionalized polyesters, polyamides or polyimides, epoxy resins, and combinations thereof and therebetween.

The epoxy resin is the product of at least partially curing a resin precursor using a curing agent and optionally a catalyst. The resin precursor is typically the mono or poly-glycidyl derivative of: aromatic diamines, aromatic monoprimary amines, aminophenols, polyhydric phenols, polyhydric alcohols, polycarboxylic acids and combinations thereof and therebetween. Specific examples are the following: epoxy novalak derived from dicyclopentadiene for example, XU71756 obtained from Dow Chemical, tetraglycidyl diamino diphenylmethane e.g. "MY 720" or "MY 721" sold by Ciba-Geigy, triglycidyl derivative of aminophenol (e.g. "MY 0510" sold by Ciba-Geigy), diglycidyl ether of 2,2-bis(4,4'-dihydroxy phenyl) propane (e.g. "Epikote 828" sold by Shell), epoxy Novolak (e.g. "DEN 431" sold by Dow), diglycidyl ether of Bisphenol F; Other epoxy resin precursors include cycloaliphatics such as 3',4'-epoxycyclohexyl-3-4-epoxycyclohexane carboxylate (e.g. CY 179 sold by Ciba-Geigy) and those in the "Bakelite" range of Union Carbide Corporation.

The thermoplast may be tailored to match the thermoset to controllably form the cocontinuous morphology. The thermoplast comprises a homopolymer and/or co- and/or ter-polymer. In a preferred embodiment the thermoplastic is a polyarylsulfone. The polyarylsulfone consists essentially of ether and/or thioether linked repeating units $[PhSO_2PhPhSO_2Ph]_m$, $(PhSO_2Ph)_n$ and/or $(Ph)_a$ wherein Ph is phenylene, a is about 0 to 2, n is about 1 up to 2, m is about 1 up to 2. Examples of polyarylsulfones are polyethersulfone ("PES"), polyetherethersulfone ("PEES"), copolymers thereof and/or combinations thereof and therebetween. Other linking groups advantageous to this invention are carbonyls, esters, amides, imides, and combinations thereof and therebetween.

The thermoplast preferably contains end groups and/or pendant groups reactive with thermoset functional groups or with a curing agent or with like groups on other polymer molecules. Examples are groups providing active hydrogen especially —OH, —$NH_2$, —NHR or —SH, where R is a hydrocarbon group containing up to 8 carbon atoms, especially epoxy, cyanate, isocyanate, acetylene or ethylene, as in vinyl, allyl, maleimide or nadimide.

The number average molecular weight of the thermoplast is suitably in the range 2000 to 60000. Preferably it is over 9000 especially over 10000 for example 11000 to 25000 and structurally as well as by chemical interaction increases toughness by comparison to the thermoset resin by itself which provides zones of the tough thermoplast between cross-linked thermoset zones. Another useful sub- range is 3000–11000, especially 3000–9000 in which it acts more as a chain-extender for the thermoset resin, separating and diluting local cross-link zones and thus toughening the structure. Within the above definition of the thermoplast those are preferably chosen which are miscible with suitable thermoset resin precursors, have high modulus and Tg, and are tough.

It is convenient to use reduced viscosity (RV), measured on a solution of 1 g of polymer in 100 ml of solution in dimethyl formamide at 25° C. as an indication of molecular weight, the approximate correlation being as follows:

| RV | 0.15 | 0.25 | 0.45 | 0.92 |
|---|---|---|---|---|
| MW (number average) | 5000 | 13000 | 20000 | 60000 |

The molecular weights were measured by vapor phase osmometry and are subject to an error range of about 10%.

In a preferred embodiment, the thermoplastic is a polyarylsulfone of molecular weight at least 9000 containing the units $(PhSO_2Ph)_n$ and $(Ph)_a$ in the proportions defined above, with possibly one or more of the said additional units in the proportions defined above, all linked through ether and/or thioether and in which at least 30% of its end groups are $NH_2$.

The weight proportion of thermoplast component in the composition is typically in the range 5–90%, preferably 20–60, most preferably 25–40%. These percentages represent non-volatile constituents after curing the thermoset resin at up to 200° C.

For epoxy resin systems the curing agent is preferably an amino compound, for example an aromatic amine or a guanidine derivative. Particular examples are 3,3'- and 4,4'-diaminodiphenylsulphone, methylenedianiline and dicyandiamide. Such amine curing agents are additional to the amine-ended thermoplast: thus the composition preferably contains epoxy-reactive amines of two types, one having a molecular weight up to 500 per amine group, the other having a molecular weight of at least 5000 per amine group, the total amine content being in the range 50 to 110%, preferably 70–110% of the stoichiometric requirement of the epoxy resin precursor. Other standard epoxy curing agents such as aliphatic diamines, amides, carboxylic acid anhydrides, carboxylic acids and phenols can be used if desired.

If a catalyst is used, it is typically a Lewis acid, for example boron trifluoride, conveniently as a derivative with an amine such as piperidine or methyl ethylamine. Alternatively it can be basic, for example an imidazole or amine or a urea such as diuron, monuron or phenuron.

For the purposes of this invention the cocontinuous phase morphology in the resin system comprises no discontinuities, as the art defines discontinuities, until the particulate toughening agent is combined with said resin system. The addition of the particulate toughening agent into the resin system introduces a discontinuous phase. This discontinuity is not integral to the resin system, but is enveloped and thereby communicates with that system. A result of the particulate toughening agent and resin system communication is a composite with tougher properties as evidenced by enhanced values for compression after impact. The thermoset and thermoplastic resin system comprises, in a preferred embodiment, an epoxy thermoset component and a polyarylsulfone thermoplastic component having a cocontinuous phase morphology in combination with a particulate toughening agent. Most preferably the thermoset consists of epoxy resins and the thermoplastic consists of polyarylsulfones in combination with the particulate toughening agent as a core-shell species wherein the inner core is harder than the outer shell.

DETAILED DESCRIPTION

The following is a detailed description of specific embodiments of the invention disclosed herein. The detailed description is not intended to limit the disclosed invention, merely to further embellish and thereby facilitate the enablement.

Damage tolerance of the system was assessed by the Compression After Impact (CAI) test per Boeing Materials Specification BMS 8-276, wherein quasi-isotropic laminate specimens were loaded to failure following a 270 inlb impact. Strengths were calculated using actual specimen thickness. G1C and G2C were determined to the same Boeing Specification.

EXAMPLE 1

A composite resin system comprising 25.8 weight percent Bisphenol F diglycidyl ether, 24.8 weight percent triglycidyl derivative of p-aminophenol, 19.4 weight percent 4,4'-diaminodiphenyl sulfone and 30 weight percent polyarylsulfone the composition as stated in Example 7 in U.S. patent application Ser. No. 07/391,279 filed Aug. 9, 1989 abandoned Mar. 26, 1991, RV=0.24, was prepared as follows. The epoxy components were heated to 71 degrees centigrade and added to the mixer, followed by the addition of the thermoplast and acetone. The admixture was mixed until the thermoplast was fully dissolved and the mixture was homogeneous. The solvent was removed under heat and/or vacuum. The curing agent was added at a volatile composition of less than about 10% by weight measured by weighing the sample, mixing was continued until volatiles were less than 3%. The composite resin was removed from the mixer and cooled to room temperature. Neat resin was degassed, cured, and examined by transmission electron microscopy to confirm the phase morphology was cocontinuous.

The composite resin was filmed in preparation for impregnating fiber to manufacture prepreg. A prepreg tape with a nominal fiber areal weight 145+5, and a resin content of 35+2 was prepared by hot melt impregnation. The composite resin was impregnated onto unidirectionally collimated intermediate modulus continuous fibers, IM7 manufactured by Hercules Incorporated, to make the prepreg. Laminates from the prepreg were prepared with plies of prepreg using the following cure cycle. Vacuum and heat were applied at 1 degree centigrade per minute to 121 degrees centigrade and held at that temperature for one hour. Pressure at 100 psi was applied to the laminate during the temperature hold. The laminate was then heated to 177 degrees centigrade at 1 degree centigrade per minute and held at that temperature for two hours. The laminate was then cooled to room temperature at 3 degrees centigrade per minute. The laminate was then subjected to physical property analysis to determine CAI, G1C, and G2C. Example 1 contained no toughening agent and was prepared as a comparative example.

EXAMPLE 2

Example 2 was prepared in the same manner as Example 1 except that 6 parts per hundred parts resin (phr) of the toughening agent Nipol 5078 available from Zeon Chemicals, Rolling Hills, Ill. Nipol 5078 is an example of the core-shell toughening agent embodiment. Nipol 5078 is comprised of a silica core combined with an elastomer shell. Nipol 5078 was added to the admixture after the thermoplast was completely dissolved and prior to removal of the solvent.

EXAMPLES 3 through 5

The prepreg of Example 1 was cut into plies to make laminates. Nipol 5078 was applied between the plies of each laminate with a spray. Nipol 5078 was suspended in hexane and sprayed on the plies using a pneumatic spray gun. After the hexane evaporated, the plies were weighed to determine the amount of toughening agent that had been applied. The plies were then laid-up and laminar structure was cured. Example 3 had 1 weight percent, Example 4 had 2.5 weight percent, and Example 5 had 6 weight percent. After the laminates had been manufactured, they were subjected to physical properties analysis.

EXAMPLES 6 through 8

The composition of Example 6 comprised 39.4 weight percent tetraglycidyl diamino diphenyl methane, 20.8 weight percent triglycidyl p-aminophenol, 17.9 weight percent 4,4'-diamino diphenyl sulfone and 21.9 weight percent of a higher molecular weight polyarylsulfone thermoplast, RV=0.26. Example 6 was made similarly to Example 1. Example 7 was the same as Example 6 except that 2.5 weight percent Nipol 5078 was added as in Example 3. Example 8 was the same as Example 6 except that 6.0 weight percent Nipol 5078 was added as in Example 3.

EXAMPLES 9 and 10

The composition in Examples 9 and 10 comprised 13.5 weight percent Bisphenol F diglycidyl ether, 18.5 weight percent triglycidyl derivative of p-aminophenol, 10 weight percent glycidyl ortho-toluidine, 21 weight percent 4,4'-diaminodiphenyl sulfone and 37 weight percent polyarylsulfone, RV=0.26. Examples 9 and 10 were made similarly to Example 1. To Example 10, 3.38 weight percent polyarylsulfone thermoplastic, RV=0.26, was added to the plies as a toughening agent as in Example 3.

EXAMPLE 11

Example 11 was made similar to Example 1 except that 4.75 weight percent polyarylsulfone theraoplastic, RV=0.26, was added as a toughening agent to the plies as in Example 3.

EXAMPLES 12 and 13

Examples 12 and 13 were made similarly to Example 6, except that 3.1 weight percent polyarylsulfone thermoplast was added to Example 12 as a toughening agent as the toughening agent was added in Example 3. 2.5 weight percent polyetheretherketone (PEEK) was added to Example 13 as a toughening agent as the toughening agent was added in Example 3.

EXAMPLE 14

The composition in Example 14 comprised 16.5 weight percent Bisphenol F diglycidyl ether, 22.5 weight percent triglycidyl derivative of p-aminophenol, 10 weight percent glycidyl ortho-toluidine, 21 weight percent 4,4'-diaminodiphenyl sulfone and 30 weight percent polyarylsulfone, RV=0.26. Example 14 was made similarly to Example 1 except 6 phr of Nipol 5078 was added to the mix as a toughening agent as in Example 2.

The results of the physical properties analysis are shown in Table 1.

TABLE 1

| Example | weight % additive | CAI (ksi) | G1C (inlb/in$^2$) | G2C (inlb/in$^2$) |
|---|---|---|---|---|
| 1 | 0 | 37.2 | 2.0 | 3.5 |
| 2 | 2.5 | 46.3 | 2.6 | 7.2 |
| 3 | 1.0 | 44.5 | 2.4 | 6.9 |
| 4 | 2.5 | 48.8 | 2.9 | 8.3 |
| 5 | 6.0 | 51.8 | 4.2 | 10.0 |
| 6 | 0 | 29.0 | 1.8 | 3.3 |
| 7 | 2.5 | 37.3 | | |
| 8 | 6.0 | 41.0 | 3.4 | 5.8 |
| 9 | 0 | 49.7 | 3.7 | 5.6 |
| 10 | 3.4 | 52.9 | 3.7 | 5.7 |
| 11 | 4.8 | 41.7 | 2.2 | 5.1 |
| 12 | 3.1 | 35.1 | 3.2 | 4.7 |
| 13 | 2.5 | 32.8 | 2.1 | 5.6 |
| 14 | 2.5 | 54.3 | — | — |

The analysis of these results can be understood by comparing the control results with those of the additive. Example 1 results should be compared with Examples 2-5 and Example 11. Example 6 results should be compared to Examples 7, 8, 12, and 13. Example 9 results should be compared to Example 10. The most important property to compare is the compression after impact results. It is noteworthy that all results, when compared to the respective control, show enhanced CAI performance. It is also noteworthy that several values for CAI are greater than 45 ksi.

We claim:
1. A composite system comprising
a.) a thermosetting resin and
b.) a thermoplastic resin, said resins having a cocontinuous phase morphology, and
c.) a particulate toughening agent having a core-shell structure.

2. A composite system, as claimed in claim 1, having a hard core and a soft shell.

3. A composite system, as claimed in claim 2, wherein the hard core is selected from the group consisting of organic polymers, inorganic oxides, naturally occurring minerals, and hardened materials selected from the group consisting of carbides, nitrides, sillicides and aluminides, and combinations thereof.

4. A composite system, as claimed in claim 3, wherein said inorganic oxides are selected from the group consisting of silica, alumina, zirconia, and combinations thereof.

5. A composite system, as claimed in claim 3, wherein said naturally occurring minerals are selected from the group consisting of feldspars, silicates, aluminates, zirconates and combinations thereof.

6. A composite system as claimed in claim 2, wherein said soft shell comprises elastomers.

7. A composite system, as claimed in claim 6 wherein said elastomers are selected from the group consisting of natural rubber, polyisoprene and copolymers thereof, ethylene propylene monomer rubber, diene-acrylonitrile copolymers, copolymers of vinyl aromatic monomers, styrene-butadiene copolymers, terpolymers of dienes with acrylonitrile or unsaturated esters and styrene or vinyltoluene, and combinations thereof.

8. A composite system, as claimed in claim 7, wherein said elastomers comprise functional groups selected from the group consisting of carboxyl, hydroxyl, epoxy, cyanate, amino, thiol, unsaturated functionality such as vinyl, propenyl, acetylene, propargyl, unsaturated imide and combinations thereof.

9. A composite system, as claimed in claim 1, wherein said thermoplastic is a polyarylsulfone.

10. A composite system, as claimed in claim 1, wherein said thermoset is an epoxy.

11. A composite system, as claimed in claim 1, having a compression after impact value greater than 45 ksi.

12. A composite system, as claimed in claim 1, wherein said system is combined with fibers.

13. A composite system, as claimed in claim 12, wherein said system is a prepreg.

14. A composite system, as claimed in claim 13, wherein said prepreg is in the form of a laminated structure.

* * * * *